UNITED STATES PATENT OFFICE.

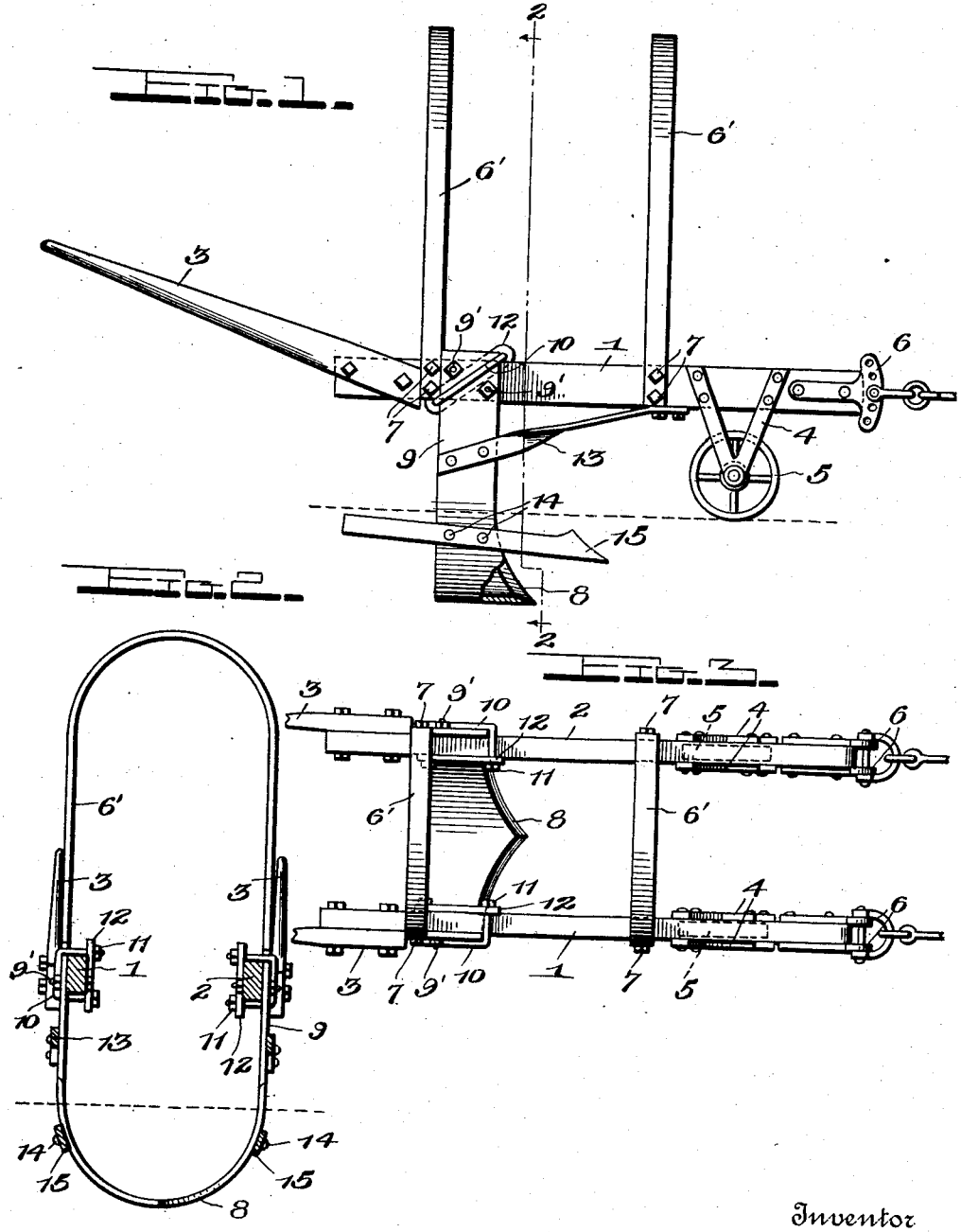

OSCAR WICK, OF EAST GRAND FORKS, MINNESOTA.

NURSERY TREE-DIGGER.

1,190,055.  Specification of Letters Patent.  Patented July 4, 1916.

Application filed October 7, 1915. Serial No. 54,627.

*To all whom it may concern:*

Be it known that I, OSCAR WICK, a citizen of the United States, residing at East Grand Forks, in the county of Polk and State of Minnesota, have invented certain new and useful Improvements in Nursery Tree-Diggers; and I do declare the following to be a full, clear, and exact description of the invention, such as will enable others skilled in the art to which it appertains to make and use the same.

This invention relates to improvements in tree diggers.

The object of the invention is to provide an improved machine especially for nursery men's use in unearthing trees, shrubs and the like.

Another object is to provide a machine which will be simple, strong, durable and inexpensive in construction, efficient and reliable in operation and well adapted to the purpose for which it is designed.

With these and other objects in view, the invention consists of certain novel features of construction, and the combination and arrangement of parts as will be hereinafter fully described and claimed.

In the accompanying drawings: Figure 1 is a side elevation of a machine constructed in accordance with this invention; Fig. 2 is a cross sectional view taken on the line 2—2 of Fig. 1; Fig. 3 is a top plan view of the machine.

Referring more particularly to the drawings, 1 and 2 represent a pair of parallel spaced beams having handles 3 at their rear ends and provided near their forward ends with brackets 4, the latter carrying supporting wheels 5 adapted to run on the ground. Clevises 6 are secured to the forward ends of the beams for the attachment of any suitable draft appliance. The beams 1 and 2 are connected at points intermediate their ends by inverted U-shaped yokes 6', suitable bolts 7 securing these members together, and disposed in a plane below said beams is a pointed knife 8, upright legs 9 being integrally connected therewith forming a U-shaped blade structure. The upper ends of the legs 9 are bolted to the beams 1 and 2 adjacent the rear yoke 6' by bolts 9' and further clamped by U-bolts 10 passing diagonally around said legs and beams. The ends of the U-bolts 10 are provided with nuts 11 which bear against clamping plates 12. A pair of braces 13 are connected at their forward ends to the beams 1 and 2 and at their rear ends to the legs 9 at points below their connection with said beams to hold the blade structure rigid. These yokes 6' and the U-shaped blade structure comprise the sole means of connecting and holding the beams 1 and 2 in spaced parallel relation. Secured to the legs 9 adjacent the knife 8 by bolts 14 are landsides 15.

In operation any suitable draft appliance is connected to the clevis 6 and the machine is drawn along the ground with the yokes 6' straddling the row of small trees or shrubs sought to be unearthed, and as they are disposed at a height to engage the upper portions of the trees, the latter will be bent over and felled when cut by the knife 8 which passes beneath and around the roots of the same. The landsides 15 throw the loose soil aside, and keep the machine steady in the ground. Owing to the fact that the forward yoke 6' is disposed in advance of the blade 8, the trees will be bent and quickly sprung over and uprooted as soon as the roots thereof are loosened. To prevent the trees from becoming bruised or injured, the yoke 6' may be padded in any convenient manner.

From the foregoing description it may be seen that this improved machine not only cuts the trees free from the soil, but it completely unearths them and throws them over on the ground ready to be gathered up and carried away.

Various minor changes in the form and proportion may be resorted to without departing from the spirit of this invention, and hence I do not wish to be limited to the construction herein shown and described other than set forth in the appended claims.

I claim as my invention:

1. A tree digger comprising a frame, a blade disposed in a plane below said frame, and an inverted U-shaped yoke carried by said frame and disposed in advance of said blade.

2. A tree digger comprising a pair of parallel spaced beams, inverted U-shaped yokes connecting said beams, and a U-shaped blade structure depending below said beams, said yokes and said U-shaped blade structure forming the sole means of holding said beams in their spaced parallel relation.

3. A tree digger comprising a pair of parallel spaced beams, inverted U-shaped yokes disposed between said beams, the ends of the former being secured to the latter, a knife disposed in a plane below said beams and upright legs integrally connected with said knife, said legs being secured at their upper free ends to said beams.

4. A tree digger comprising a pair of parallel spaced beams, inverted U-shaped yokes disposed between said beams, the ends of the former being secured to the latter, a knife disposed in a plane below said beams, upright legs integrally connected with said knife, said legs being secured at the upper free ends to said beams, and land sides carried by said legs at points adjacent said knife.

5. A tree digger comprising a pair of parallel spaced beams, supporting wheels mounted beneath said beams, inverted U-shaped yokes disposed between said beams and secured thereto, a pointed knife disposed in a plane below said beams, upright legs integrally connected with said knife and secured to said beams, land sides carried by said legs, and handles secured to the rear ends of said beams.

In testimony whereof I have hereunto set my hand in presence of two subscribing witnesses.

OSCAR WICK.

Witnesses:
FRED FREUND,
M. H. STUARD.

Copies of this patent may be obtained for five cents each, by addressing the "Commissioner of Patents, Washington, D. C."